(12) United States Patent
Ikeuchi

(10) Patent No.: US 8,275,941 B2
(45) Date of Patent: Sep. 25, 2012

(54) INFORMATION PROCESSING APPARATUS, RAID CONTROLLER CARD, AND A MIRRORING METHOD

(75) Inventor: Itaru Ikeuchi, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/100,888

(22) Filed: May 4, 2011

(65) Prior Publication Data
US 2012/0005410 A1   Jan. 5, 2012

(30) Foreign Application Priority Data
Jun. 30, 2010   (JP) .................. 2010-150034

(51) Int. Cl.
G06F 12/00   (2006.01)
(52) U.S. Cl. ..................................... 711/118
(58) Field of Classification Search .............. None
See application file for complete search history.

(56) References Cited

U.S. PATENT DOCUMENTS

| | | | |
|---|---|---|---|
| 7,725,661 B2 * | 5/2010 | Liu et al. ............... | 711/144 |
| 2007/0183198 A1 | 8/2007 | Otsuka et al. | |
| 2008/0005465 A1 * | 1/2008 | Matthews ............... | 711/113 |
| 2008/0112224 A1 | 5/2008 | Lee et al. | |

FOREIGN PATENT DOCUMENTS

| | | |
|---|---|---|
| JP | 2007-180610 | 7/2007 |
| JP | 2008-123481 | 5/2008 |
| JP | 2009-015364 | 1/2009 |
| WO | WO 2005-096220 | 10/2005 |

* cited by examiner

*Primary Examiner* — Hiep Nguyen
(74) *Attorney, Agent, or Firm* — Blakely, Sokoloff, Taylor & Zafman LLP

(57) ABSTRACT

According to one embodiment, an information processing apparatus includes a controller configured to write, first data to a first storage device from a first address to a second address according to a size of the first data, to write second data having a part of the first data to a second storage device from the first address, a size of the second data being equal to n times a page size, to write, to a cache memory, third data which is equal to the first data except the second data, and to write, when the controller receives a writing instruction includes third address being adjacent to the second address and fourth data, fifth data to the second storage device, the fifth data having the third data and at least part of fourth data, and a size of the fifth data is equal to the page size.

19 Claims, 4 Drawing Sheets

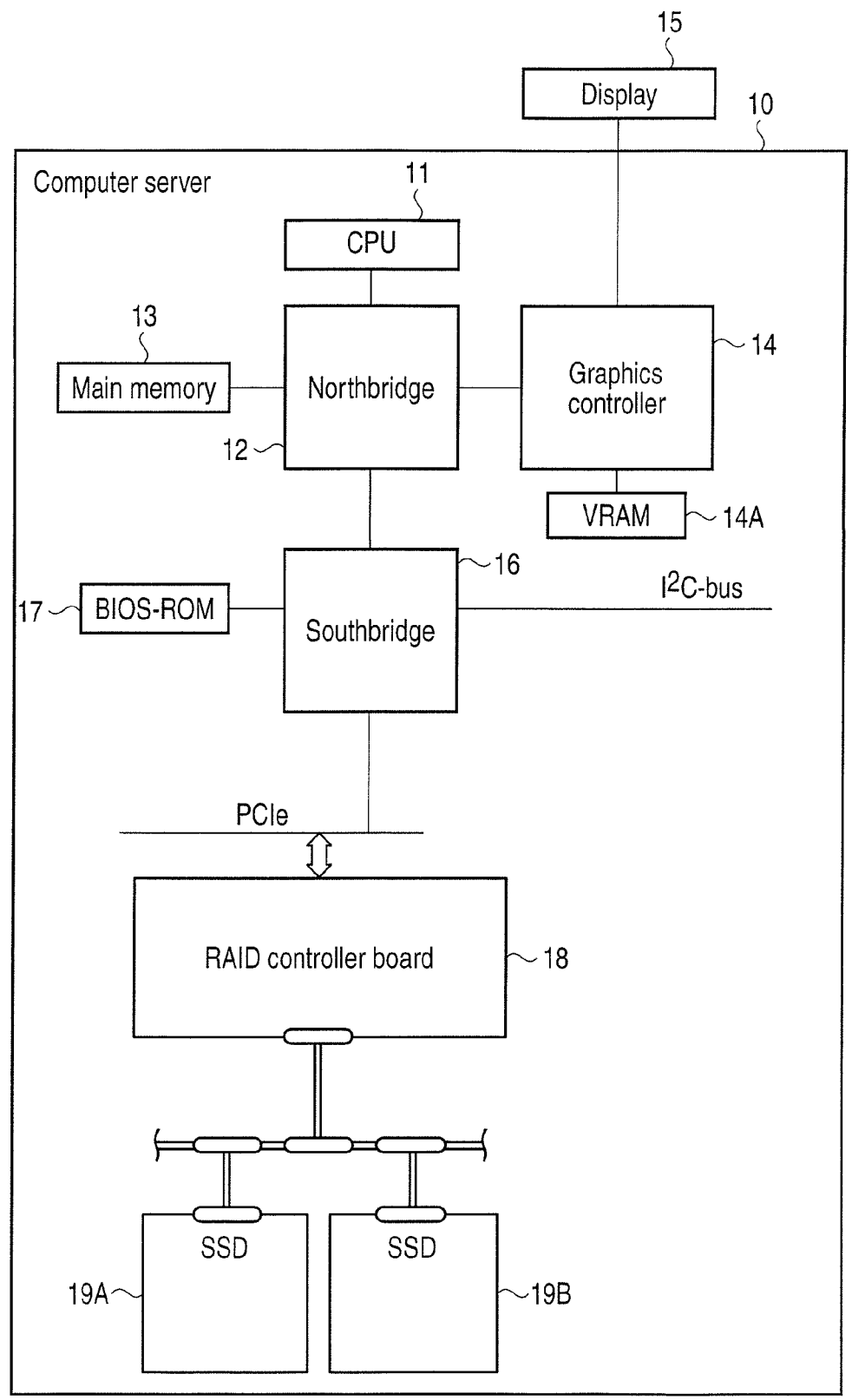
F I G. 1

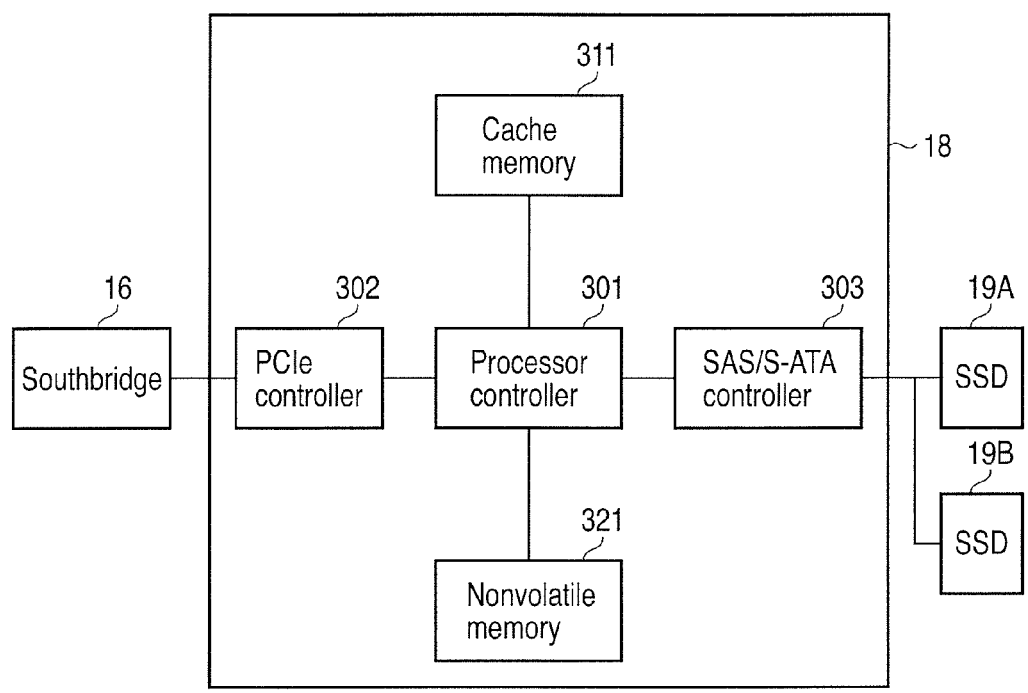
F I G. 3

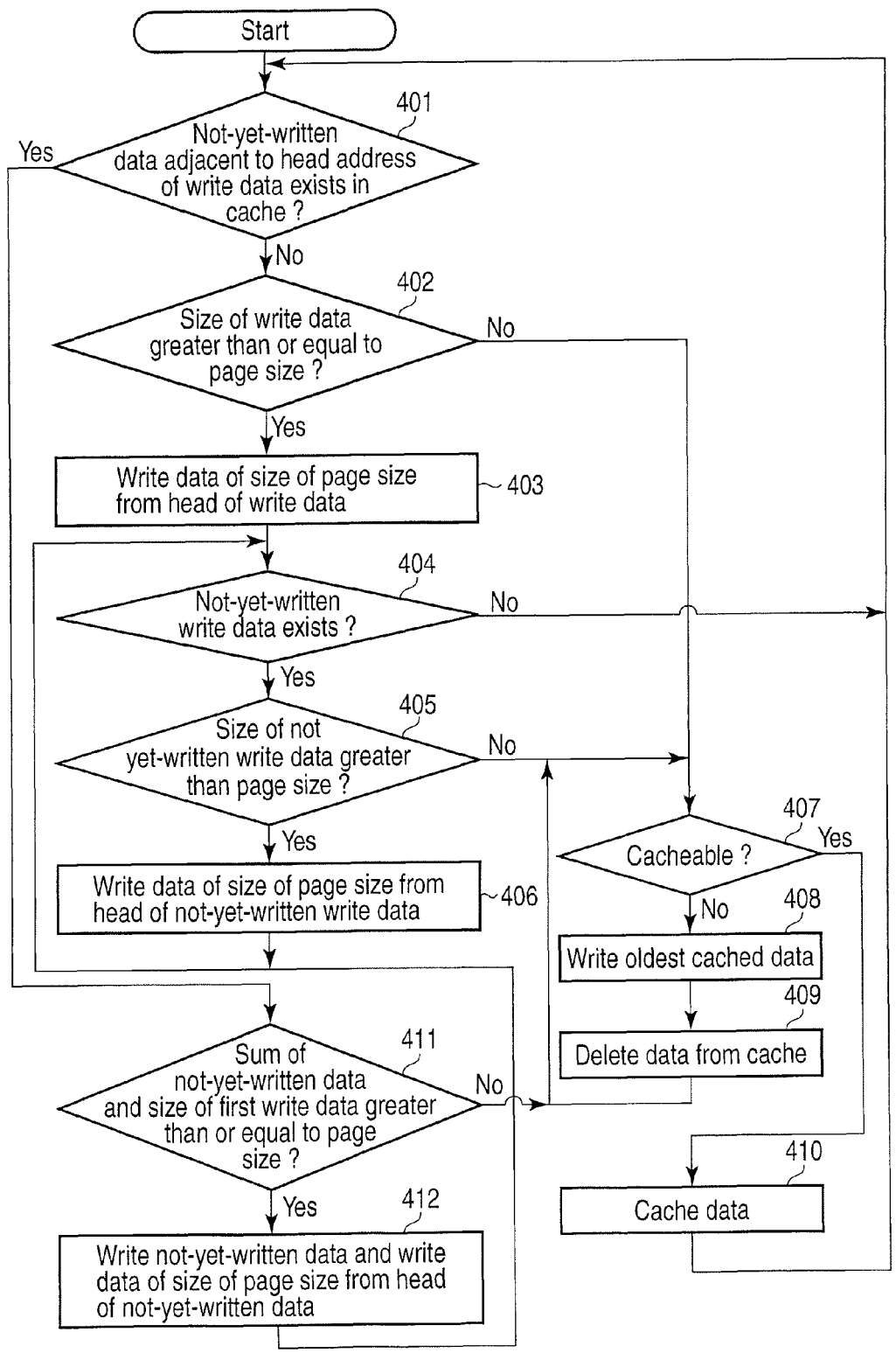
F I G. 4

US 8,275,941 B2

INFORMATION PROCESSING APPARATUS, RAID CONTROLLER CARD, AND A MIRRORING METHOD

CROSS-REFERENCE TO RELATED APPLICATIONS

This application is based upon and claims the benefit of priority from Japanese Patent Application No. 2010-150034, filed Jun. 30, 2010; the entire contents of which are incorporated herein by reference.

FIELD

Embodiments described herein relate generally to an information processing apparatus configured to write the same data to a plurality of storage devices, a RAID controller card, and a mirroring method.

BACKGROUND

Mirroring by means of a Redundant Array of Inexpensive Disks (RAID) 1 is a technique of improving reliability of data to be written to a storage device.

In mirroring, the same data is simultaneously written to a plurality of devices.

Recently, hard disc drives are beginning to be replaced with solid-state drives (SSDs), which use nonvolatile memory as a storage medium. NAND flash memories are often used as such nonvolatile memories.

A NAND flash memory writes and reads data per page unit, and erases data per block unit, including a plurality of pages. A NAND flash memory is limited as to the number of times of rewriting.

When SSDs comprising NAND flash memories as storage for mirroring are used, since data with the same content will be written thereto, the lifespan will expire approximately at the same time. In some products, since data cannot be read after the lifespan expires, the reliability of data will be decreased.

It is therefore desired to provide difference in the lifespan of storage devices when mirroring is performed using storage devices configured to write and read data per page unit and erase data per block unit, including a plurality of pages.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram illustrating an example of a configuration of an information processing device of an embodiment.

FIG. 3 is an exemplary block diagram illustrating an example of a system configuration of a RAID controller card of the embodiment.

FIG. 4 is an exemplary flowchart illustrating a procedure of a writing process of a RAID controller of the embodiment.

DETAILED DESCRIPTION

Figure 2:
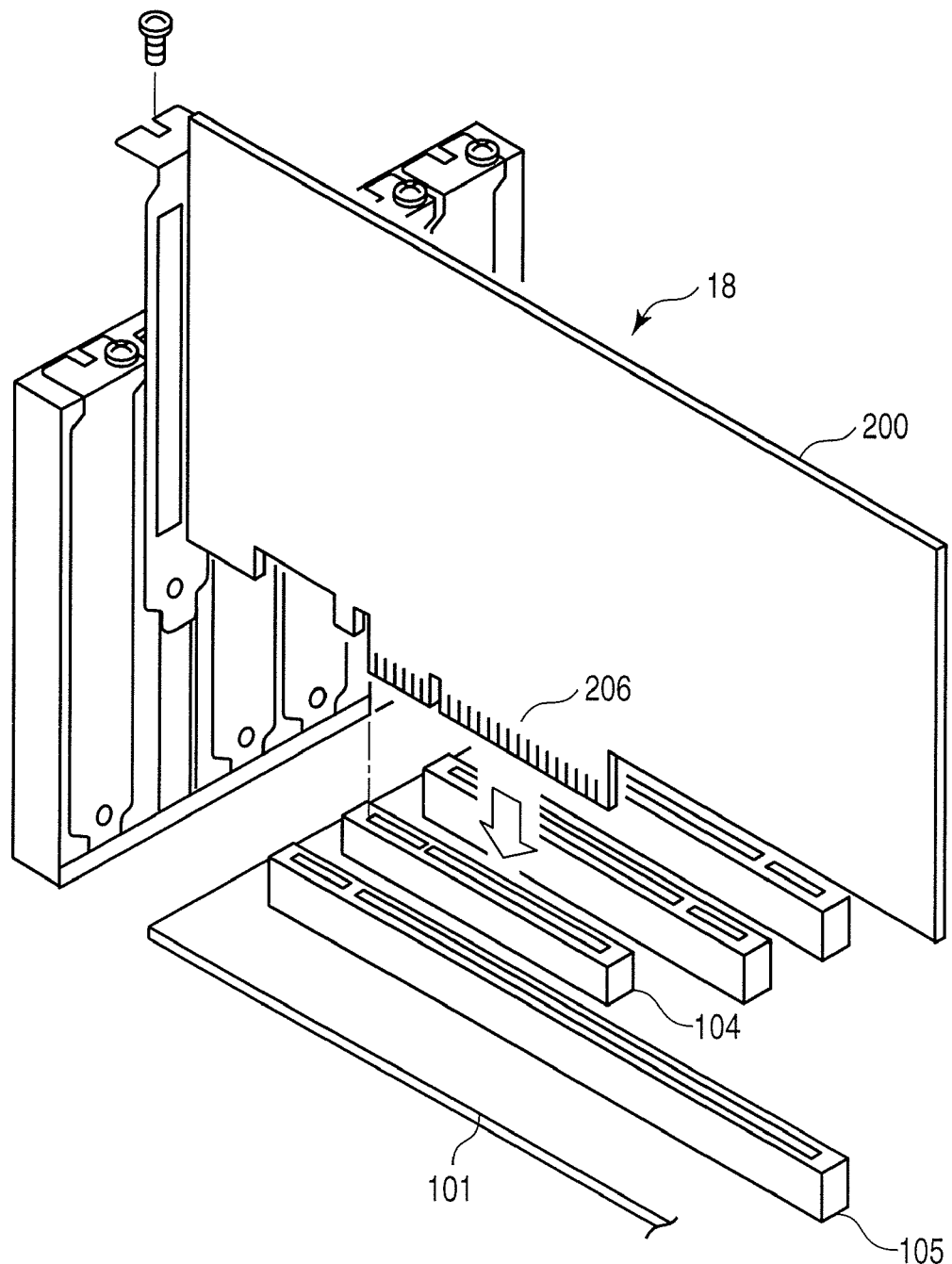
FIG. 2 is an exemplary perspective view illustrating an outer view of a main board and a RAID controller card of the embodiment.

Various embodiments will be described hereinafter with reference to the accompanying drawings.

In general, according to one embodiment, an information processing apparatus, includes a cache memory and a controller. The controller is configured to write data to the same address of a first storage device and a second storage device which are configured to write and read data per block unit and to erase data per block unit comprising pages, wherein the controller is configured to write, first data to the first storage device from a first write address to a second write address according to a size of the first data when the controller receives a writing instruction comprising the first write address and the first data, to write second data having a part of the first data to the second storage device from the first write address, a size of the second data is equal to n times a page size where n is an integer greater than or equal to 1, to write, to the cache memory, third data which is equal to the first data except the second data, a size of the third data is smaller than the page size, and to write, when the controller receives a writing instruction comprising third write address is adjacent to the second write address and fourth data, fifth data to the second storage device, the fifth data having the third data and at least part of fourth data, and a size of the fifth data is equal to the page size.

An information processing device according to an embodiment will be described with reference to FIG. 1. The information processing device is embodied as a computer.

FIG. 1 is a block diagram illustrating a system configuration of a computer 10. As shown in FIG. 1, the computer 10 comprises a CPU 11, a northbridge 12, a main memory 13, a graphics controller 14, a VRAM 14A, a southbridge 16, a BIOS-ROM 17, a RAID controller card 18, a solid-state disk (SSD) 19, and the like.

The CPU 11 is a processor configured to control the operation of members inside the computer 10. The CPU 11 executes an operating system loaded from the SSD 19 into the main memory 13, and a variety of programs operated under the control of the operating system. Further, the CPU 11 also executes a basic input/output system (BIOS) stored in the BIOS-ROM 17. In the description that follows, the basic input/output system itself stored in the BIOS-ROM 17 is sometimes referred to as the BIOS.

The northbridge 12 is a bridge device connecting a local bus of the CPU 11 and the southbridge 16. The northbridge 12 has a function of executing communications with the graphics controller 14 via a bus, and includes a memory controller designed to control access of the main memory 13. The graphics controller 14 is a display controller configured to control a display 15 of the computer 10. The graphics controller 14 generates a video signal to be transmitted to the display 15 based on image data written to the VRAM 14A.

The southbridge 16 is a controller designed to control a variety of devices of the PCI Express (PCIe) bus. The southbridge is also equipped with a function of controlling the BIOS-ROM 17, which is directly connected thereto.

The SSD is formed of a NAND flash memory (non-volatile memory), for example. In a NAND flash memory, data is written and read per page unit, and data is erased per block unit including a plurality of pages.

FIG. 2 is a perspective view illustrating a main board on which the CPU 11, the main memory 13, and the like are mounted, and a RAID controller card 18.

As shown in FIG. 2, a plurality of expansion slots 104, 105 are provided on the main board 101. A PCIe bus is connected to the expansion slots 104, 105. A PCI Express expansion card of 8 lanes or fewer can be inserted into the expansion slot 104, and a PCI Express expansion card of 16 lanes or fewer can be inserted into the expansion slot 105. As shown in FIG.

2, a connector portion 206 of an expansion board 200 forming the RAID controller card 18 is inserted into the expansion slot 104.

When a problem occurs in the RAID controller card 18, the computer 10 will be switched from a hardware mode, which is a normal operation mode, to a hardware safe mode or a software safe mode. Usually, when a problem occurs in the RAID controller card 18, the RAID controller card 18 will stop functioning and the computer 10 will not operate either. The computer 10 is capable of continuing being operated by being switched to the hardware safe mode or the software safe mode.

In the hardware safe mode, a device which is a cause of the problem is stopped. In the software safe mode, the CPU 11 performs a writing process, such as parity computing, and a reading process.

Next, a system configuration of the RAID controller card 18 will be described with reference to FIG. 3. The RAID controller card 18 comprises a processor controller 301, a PCIe controller 302, an SAS/S-ATA controller 303, a cache memory 311, and a nonvolatile memory 321.

The processor controller 301 executes a firmware stored in the nonvolatile memory 321. The PCIe controller 302 is a PCI Express interface designed to control transmission of data to and from the southbridge 16. The SAS/S-ATA controller 303 is an interface designed to control transmission of data to and from the SSD 19. The cache memory 311 is formed of a double-data-rate2 synchronous dynamic random access memory (DDR2 SDRAM), for example.

The RAID controller card 18 performs mirroring, i.e., writes the same data to two SSDs 19 when an instruction to write data is received. In general mirroring, the same data is written to two storages, but the RAID controller card 18 performs a process different from the general mirroring. The RAID controller writes data immediately to the SSD 19A, but performs a writing process on the SSD 19B collectively with other data, such that data is written thereto per page unit.

Next, the procedure for write data to the SSD 19B will be described with reference to the flowchart of FIG. 4.

Upon receipt of a writing instruction including a write start address and write data, the processor controller 301 determines whether data yet to be written adjacent to the write data is stored in the cache memory 311 formed of a volatile memory (block 401).

When it has been determined that data yet to be written is not stored (No in block 401), the processor controller 301 determines whether the size of the write data is greater than or equal to a page size of the NAND flash memory forming the SSD 19B (block 402). The page size is stored in the nonvolatile memory 321. It is to be noted that the page size can be varied via a BIOS screen, for example.

When the size of the write data has been determined as being greater than or equal to the page size (Yes in block 402), the processor controller 301 writes data of the page size from a head of the write data from the write start address of the SSD 19B (block 403).

The processor controller 301 determines whether there is write data yet to be written (block 404). When the processor controller 301 has determined that there is no write data yet to be written (No in block 404), the processor controller 301 ends the procedure. When the processor controller 301 has determined that there is data yet to be written (Yes in block 404), the processor controller 301 determines whether the size of the data yet to be written is greater than or equal to the page size (block 405). When the processor controller 301 has determined that the size of the data yet to be written is greater than or equal to the page size (Yes in block 405), the processor controller 301 writes data of the page size from the head of the data yet to be written from the write start address of the SSD 19B (block 406). The write start address is an address adjacent to write data already written to the SSD 19B. After the block 406, processes from block 404 are sequentially executed. Through processes from block 403 to block 406, data of n times (where n is an integer greater than or equal to 1) the page size is written to the SSD 19B from the head of the write data.

A process will be described that is performed when it has been determined in block 402 that the size of the write data is not greater than or equal to the page size (No in block 402), or when it has been determined in block 405 that the size of data yet to be written is not greater than or equal to the page size (No in block 405). The processor controller 301 acquires a vacant capacity of the cache memory 311. The processor controller 301 determines whether write data or data yet to be written can be stored in the cache memory 311, by determining whether the size of the write data or the data yet to be written is greater than the vacant capacity (block 407). When it has been determined that write data or data yet to be written can be stored (Yes in block 407), the processor controller 301 records write data or data yet to be written to the cache memory 311, together with the write start address (block 410).

When it has been determined that the write data or data yet to be written cannot be stored in the cache memory 311 (No in block 407), the processor controller 301 records the oldest data recorded in the cache memory 311 in the SSD 19B (block 408). The recorded data is deleted from the cache memory 311 (block 409). After that, the procedure returns to block 407, and the processor controller 301 determines again whether write data or data yet to be written can be stored in the cache memory 311.

When it has been determined that data yet to be written adjacent to the write data is stored in the cache memory 311 (Yes in block 401), the processor controller 301 determines whether the sum of the size of data yet to be written and the size of the write data is greater than or equal to the page size (No in block 411). When it has been determined that the sum of the size of data yet to be written and the size of the write data is not greater than or equal to the page size (No in block 411), the processor controller 301 sequentially performs processes from the block 407. When it has been determined that the sum of the size of data yet to be written and the size of the write data is greater than or equal to the page size (Yes in block 411), the processor controller 301 writes data yet to be written and write data of the page size from the head of the data yet to be written (block 412). After writing, the processor controller 301 sequentially performs processes from block 404.

As described above, the description of the writing process is ended. By switching the writing process between the SSD 19A and the SSD 19B, writing to two SSDs 19A, 19B can be unevenly performed. By unevenly performing the writing, it is possible to prevent the lifespan of the two SSDs 19A, 19B from expiring simultaneously, and the RAID-based system can be reliably operated.

It is to be noted that the controller performs a process of writing data in the cache memory to the SSD 19B upon detection of shutdown of the device. Further, when a problem has occurred in the SSD 19A and the SSD 19A has been replaced with a new SSD, the controller sets the SSD 19B as the SSD 19A, and the new SSD as the SSD 19B.

When the device has incorrectly ended, the controller reconstructs data to be stored in the SSD 19B based on the data stored in the SSD 19A.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a cache memory; and
   a controller configured to write data to the same address of a first storage device and a second storage device which are configured to write and read data per page and to erase data per block unit comprising pages,
   wherein the controller is configured to:
   write first data to the first storage device from a first write address to a second write address according to a size of the first data when the controller receives a writing instruction comprising the first write address and the first data;
   write second data having first data to the second storage device from a head of the first data, a size of the second data is equal to n times a page size, where n is an integer greater than or equal to 1;
   write, to the cache memory, third data having a size equal to a difference between the size of the first data and the size of the second data, the size of the third data is smaller than the page size; and
   write fifth data to the second storage device when the controller receives a writing instruction comprising from a third write address is adjacent to the second write address, the fifth data comprising the third data and at least part of fourth data, and a size of the fifth data is equal to the page size.

2. The apparatus of claim 1, wherein
   the controller is configured to:
   determine whether a size of data that can be written to the cache memory is smaller than the size of the third data before the third data is written to the cache memory;
   write at least part of data in the cache memory to the second storage device when the size of data that can be written to the cache memory is determined as being smaller than the size of the third data;
   delete the data written to the second storage device from the cache memory; and
   write the third data to the cache memory.

3. The apparatus of claim 1, wherein the controller is configured to write the third data in the cache memory to the second storage device when the apparatus is shut down.

4. The apparatus of claim 1, further comprising a setting module configured to set the second storage device as the first storage device and set the third storage device as the second storage device, when a problem occurs in the first storage device and the first storage device is replaced with a third storage device.

5. The apparatus of claim 1, wherein the controller is configured to reconstruct data in the second storage device based on data in the first storage device when the apparatus has been shutted down incorrectly.

6. The apparatus of claim 1, wherein the first storage device and the second storage device comprise a NAND type nonvolatile memory.

7. The apparatus of claim 1, wherein the cache memory comprises a volatile memory.

8. A RAID controller card, comprising:
   a cache memory; and
   a controller configured to write data to the same address of a first storage device and a second storage device which are configured to write and read data per page and to erase data per block unit comprising pages,
   wherein the controller is configured to:
   write first data to the first storage device from a first write address to a second write address according to a size of the first data when the controller receives a writing instruction comprising the first write address and the first data;
   write second data having first data to the second storage device from a head of the first data, a size of the second data is equal to n times a page size, where n is an integer greater than or equal to 1;
   write, to the cache memory, third data having a size equal to a difference between the size of the first data and the size of the second data, the size of the third data is smaller than the page size; and
   write fifth data to the second storage device when the controller receives a writing instruction comprising from a third write address is adjacent to the second write address the fifth data comprising the third data and at least part of fourth data, and a size of the fifth data is equal to the page size.

9. The RAID controller card of claim 8, wherein
   the controller is configured to:
   determine whether a size of data that can be written to the cache memory is smaller than the size of the third data before the third data is written to the cache memory;
   write at least part of data in the cache memory to the second storage device when the size of data that can be written to the cache memory is determined as being smaller than the size of the third data;
   delete the data written to the second storage device from the cache memory; and
   write the third data to the cache memory.

10. The RAID controller card of claim 8, wherein
    the controller is configured to write the third data in the cache memory to the second storage device when the apparatus is shut down.

11. The RAID controller card of claim 8, further comprising a setting module configured to set the second storage device as the first storage device and set the third storage device as the second storage device, when a problem occurs in the first storage device and the first storage device is replaced with a third storage device.

12. The RAID controller card of claim 8, wherein the cache memory comprises a volatile memory, and
    the controller is configured to reconstruct data in the second storage device based on data in the first storage device when the apparatus has been shutted down incorrectly.

13. The RAID controller card of claim 8, wherein the first storage device and the second storage device comprise a NAND type nonvolatile memory.

14. A mirroring method of writing data to the same address of a first storage device and a second storage device which are configured to write and read data per page and to erase data per block unit comprising pages, the method comprising:

writing first data to the first storage device from a first write address to a second write address according to a size of the first data upon receiving a writing instruction comprising the first write address and the first data;

writing second data having data to the second storage device from a head of the first data, a size of the second data is equal to n times a page size where n is an integer greater than or equal to 1;

writing, to the cache memory, third data having a size equal to a difference between the size of the first data and the size of the second data, the size of the third data is smaller than the page size; and writing fifth data to the second storage device upon receiving a writing instruction from a third write address adjacent to the second write address, when the controller receives a writing instruction comprising third write address is adjacent to the second write address and fourth data, fifth data to the second storage device, the fifth data comprising the third data and at least part of fourth data, and a size of the fifth data is equal to the page size.

15. The method of claim 14, further comprising:

determining whether a size of data that can be written to the cache memory is smaller than the size of the third data before the third data is written to the cache memory;

writing at least part of data in the cache memory to the second storage device when the size of data that can be written to the cache memory is determined as being smaller than the size of the third data;

deleting the data written to the second storage device from the cache memory; and writing the third data to the cache memory.

16. The method of claim 14, further comprising:

writing the third data in the cache memory to the second storage device when the apparatus is shut down.

17. The method of claim 14, further comprising:

setting the second storage device as the first storage device and set the third storage device as the second storage device when a problem occurs in the first storage device and the first storage device is replaced with a third storage device.

18. The method of claim 14, wherein the cache memory comprises a volatile memory, and the method further comprises reconstructing data in the second storage device based on data in the first storage device when the apparatus has been shutted down incorrectly.

19. The method of claim 14, wherein the first storage device and the second storage device comprise a NAND type nonvolatile memory.

* * * * *